Figure 1:
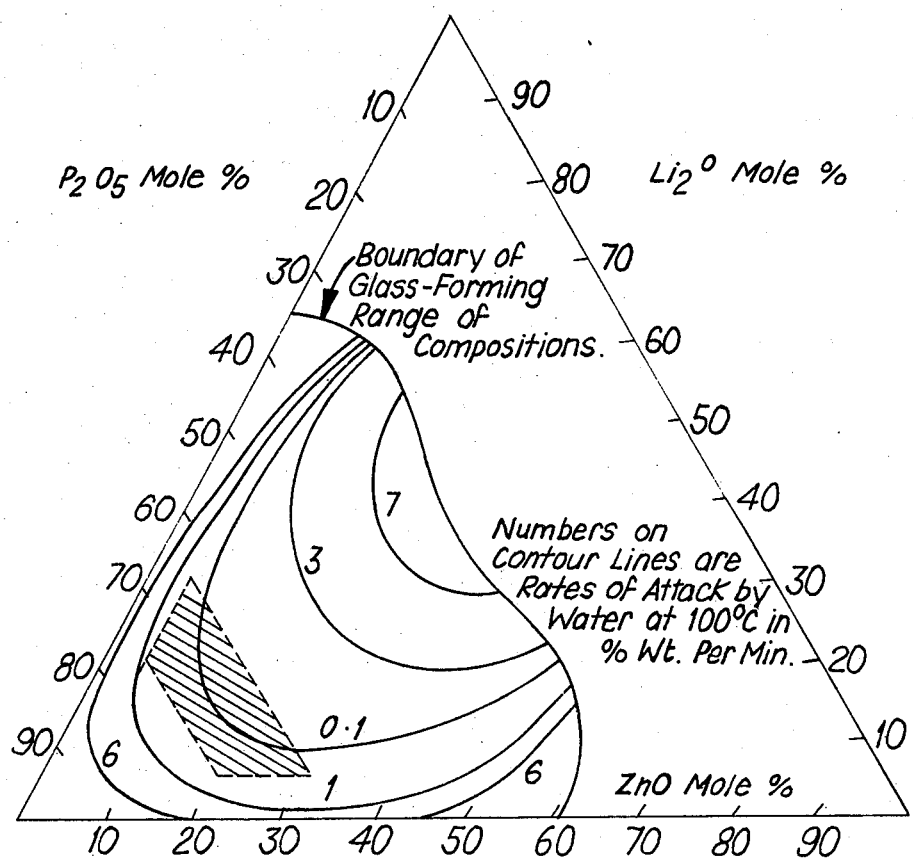

United States Patent [19]
Ray et al.

[11] 3,885,973
[45] May 27, 1975

[54] Li$_2$O-ZnO-P$_2$O$_5$-GLASS

[75] Inventors: Neil Hunter Ray; John Nicolas Clayton Laycock, both of Runcorn, England

[73] Assignee: Imperial Chemical Industries Limited, Millbank, London, England

[22] Filed: May 29, 1973

[21] Appl. No.: 364,637

[30] Foreign Application Priority Data
June 8, 1972 United Kingdom............... 26807/72

[52] U.S. Cl. ............................................... 106/47 R
[51] Int. Cl. ........................... C03c 3/16; C03c 3/30
[58] Field of Search ................... 106/47 P, 47 R, 52

[56] References Cited
UNITED STATES PATENTS
2,920,972   1/1960   Godron ............................ 106/47 R OTHER PUBLICATIONS
Deutschbein, et al., – "Les Verres Phosphates, Nouveaux Materiaux Laser" – Revuede Physique Appliquere, 2 March 1967, p. 29 and 33.

Primary Examiner—Winston A. Douglas
Assistant Examiner—Mark Bell
Attorney, Agent, or Firm—Cushman, Darby & Cushman

[57] ABSTRACT

Inorganic oxide glasses having compositions within the range (mole %)

$P_2O_5$ 58–76
ZnO          5–30
$Li_2O$        5–25
Alkaline earths       0–10 have good durability and low softening points.

7 Claims, 1 Drawing Figure

$Li_2O$-$ZnO$-$P_2O_5$-GLASS

This invention relates to inorganic oxide glasses.

The invention provides inorganic oxide glasses having compositions in the range (moles %):

| | |
|---|---|
| $P_2O_5$ | 58–76 |
| ZnO | 5–30 |
| $Li_2O$ | 5–25 |
| alkaline earths | 0–10 | the total of all the above components being at least 99 moles % of the total composition, apart from water which may be present in amounts up to 5% by weight of the total, and apart from minor constituents for example $SiO_2$ and $Na_2O$ which amount to not more than 1 mole % of the total.

We have found that lithium/zinc phosphate glasses of this type which can have transformation temperatures in the range 140°–280°C according to water content, exhibit unexpectedly good resistance to attack by water when their compositions lie in the range quoted above.

Preferably the $P_2O_5$ content lies between 65 and 76 moles %. Preferably also, the alkaline earths, if present, are magnesium oxide or barium oxide to the extent of up to 5 mole %.

The attached diagram (FIG. 1) is a ternary diagram of the three-component system $Li_2O$—ZnO—$P_2O_5$ showing contours of approximately equal rate of attack by water. The shaded zone indicates a region of maximum durability (minimum rate of attack by water) for this system. The addition of alkaline earths may further improve the durability.

A preferred composition which has good durability is as follows (mole %):

| | |
|---|---|
| $P_2O_5$ | 68.3 |
| ZnO | 9.75 |
| $Li_2O$ | 19.5 |
| MgO | 2.44 |

Glasses according to the invention may be effective as fire-retardant additives in reinforced thermosetting composite materials as described in our copending British Pat. Nos. 26806/72, 2190/73. While any glasses within the scope of the invention may be effective as fire retardants, it may be desirable that the glasses should contain from 5–10 moles % of alkaline earths. A preferred composition within this range is as follows (moles %):

| | |
|---|---|
| $P_2O_5$ | 65.1 |
| ZnO | 9.3 |
| $Li_2O$ | 18.6 |
| BaO | 7.0 |

The glasses may be prepared by heating together the appropriate oxides, or their precursors. By 'precursor' is meant a compound which on heating will react with the other components present to give the same chemical composition in the product as if the oxide had been used. Usually this reaction will occur with evolution of one or more volatile compounds, for example water, carbon dioxide and ammonia. Thus suitable precursors of phosphoric oxide include phosphoric acid and ammonium phosphates, while carbonates may be used as precursors of metal oxides. Mixtures of an oxide and a precursor of that oxide, or of two or more precursors of the same oxide may be used, and the same compound may be used as a precursor of more than one oxide, thus for example lithium phosphate is a precursor of $Li_2O$ and of $P_2O_5$.

The heating may be carried out in a two-stage process, in which some or all of the components are first heated together at a relatively low temperature, for example 300°–500°C, to give a glassy mixture (conveniently referred to as the premelt), which is then refined at a higher temperature, for example 500°–800°C. The duration of the first stage of the heating process, to form the premelt, is generally from 1–8 hr. When preparing a 2kg batch, a time of 2½ to 4½ hours is convenient. If less than all of the components are present at the initial heating stage the remaining material may be added subsequently before or during the refining stage. This method is convenient for small scale laboratory preparations, but alternatively the components may be mixed together and heated for example to 500°–800°C in a single stage operation. The addition of the components may be made all at once or sequentially in a batch process, but it may be desirable, particularly when operating upon a large scale, to form the glass in a continuous process in which the mixture of components is continually or periodically being added to, and glass removed from, a reaction vessel maintained at the refining temperature.

During refining water is gradually lost, the glass network becomes more highly crosslinked, and the viscosity and transformation temperature (Tg) of the glass increase. Small amounts of volatile oxide components, for example $P_2O_5$, may be lost during the refining stage, and it is desirable to keep the temperature below 800°C when refining glasses according to the invention, to minimise any such loss. Glasses outside the scope of the invention containing more than 76% $P_2O_5$ are liable to lose $P_2O_5$ by volatilisation even at temperatures below 800°C. As mentioned above, the residual water in glasses according to the invention may represent up to 5% by weight of the total, but is not included in the compositions set out above, which may be regarded as nominal molar compositions, in that they are based upon the composition of the initial mixture of components.

A glass of a given composition may have a range of transformation temperatures, depending upon the refining conditions, and a glass having any desired transformation temperature within this range may be obtained by routine experimentation involving selection of the appropriate conditions, for example time, temperature and batch size, in the refining step. The length of refining time required for a particular glass composition to reach a particular transformation temperature cannot be specified, as it depends upon the size of the batch, the type of furnace and crucible used, the exact temperature of the furnace, the furnace atmosphere and other variables. In general, the refining time may vary from 1 hour to one week, depending upon the desired transformation temperature and the variables listed above. However, if a given glass composition is refined until it reaches a given transformation temperature, which may be determined simply by differential thermal analysis of a cooled sample of the glass, properties such as water resistance will be reproducible from one batch of that composition to another. In general, the water resistance of a given glass composition increases with its transformation temperature.

An advantage of the glass compositions of the present invention is their resistance to attack by water. The rate at which the glasses are dissolved by water may be expressed as the rate of loss of weight of a standard sample in units of %/min at a given water temperature.

The rate of solution at the boiling point of water is determined by the following procedure: Approximately 2g of molten glass is poured on to a steel plate and allowed to cool. The resulting smooth disc of glass, approximately 2cm in diameter and 0.3cm thick, is weighed, immersed in boiling water for 1 hour, dried and reweighed. The weight loss divided by the initial weight and multiplied by 100/60 gives the percentage weight loss/minute.

The transformation temperature of the glass is determined by differential calorimetry using the Du Pont Differential Thermal Analyser. A sample of the powdered glass and a reference sample of pure powdered silica are heated at a programmed rate of temperature increase of 20°C/min, and a graph is obtained of the temperature difference between the samples plotted against the temperature of the reference sample. This curve typically has a linear portion of small slope and a second linear portion of larger negative slope at higher temperatures. The two linear portions are produced so that they intersect, and the transformation temperature is taken as the temperature corresponding to the point of intersection.

The glasses of the invention may be suitable for co-processing with organic polymers in composites as described in our copending British Pat. No. 18481/70 and with inorganic components as described in our copending British Pat. No. 48103/71. They may also be co-processed with pigments, opacifiers and the like.

Glasses according to the present invention preferably have transformation temperatures below 300°C, and may have transformation temperatures below 200°C. Preferably the rate of solution of the glasses in water at 100°C is less than 1%/min.

EXAMPLE 1

2.339 grams of 88% orthophosphoric acid, 222 grams of lithium carbonate, 122 grams of zinc oxide, and 15 grams of magnesium oxide (corresponding to molar proportions of 68.3% $P_2O_5$, 19.5% $Li_2O$, 9.75% ZnO and 2.44% MgO) were mixed and when the evolution of carbon dioxide had ceased the mixture was heated with stirring according to the following time-table:

| Time from Start hours | Temperature °C |
|---|---|
| ¾ | 155 |
| 1 | 170 |
| 2 | 180 |
| 2¾ | 190 |
| 3 | 285 |
| 4 | 290 |
| 5 | 305 |
| 6 | 325 |

After 6 hours the stirrer was removed, and the molten mixture transferred to a graphite crucible which was heated in a furnace at 700°C. for 8 hours. The resulting glass was poured into a stainless steel mould and allowed to cool. Analysis showed it to contain 2.7% by weight of combined water and 39.0% by weight of phosphorus. It had the following properties:

| | |
|---|---|
| Transformation temperature | 178°C |
| $10^6$ - poise temperature | 302°C |
| $10^5$ - poise temperature | 343°C |
| Young's Modulus | $6.9 \times 10^6$ lb./in$^2$ |
| Tensile strength | $6.9 \times 10^4$ lb./in$^2$ |
| Density | 2.5g/cm$^3$ |
| Rate of attack by water at 65°C. | 11% per hour |
| at 100°C | 0.2% per minute |

EXAMPLE 2 and 3

Following the general procedure described in Example 1, two additional glasses were prepared with the compositions given below. Their transformation temperatures, densities and resistance to attack by water were found to be as given in the following table:

| Ex. | Composition Mole % | | | | Transformation Temperature °C | Density g/cm³ | Rate of attack by Water at 100°C % per minute |
|---|---|---|---|---|---|---|---|
| | $P_2O_5$ | ZnO | $Li_2O$ | MgO | | | |
| 2 | 76.0 | 9.6 | 9.6 | 4.8 | 182 | 2.41 | 0.4 |
| 3 | 66.6 | 9.5 | 19.1 | 4.8 | 203 | 2.43 | 0.3 |

EXAMPLES 4 to 7

Following the procedure of Example 1, but substituting barium oxide for magnesia, the following glasses were prepared.

| Ex. | Composition Mole % | | | | Transformation Temperature °C | Density g/cm³ | Rate of attack by Water at 100°C % per minute |
|---|---|---|---|---|---|---|---|
| | $P_2O_5$ | ZnO | $Li_2O$ | BaO | | | |
| 4 | 76.0 | 9.6 | 9.6 | 4.8 | 176 | 2.52 | 0.2 |
| 5 | 68.3 | 9.8 | 49.5 | 2.4 | 209 | 2.49 | 0.4 |
| 6 | 66.6 | 9.5 | 19.1 | 4.8 | 216 | 2.50 | 0.1 |
| 7 | 65.1 | 9.3 | 18.6 | 7.0 | 230°C | 2.52 | 0.03 |

EXAMPLE 8

Following the procedure of Example 1, the following glass containing no alkaline earth and a high zinc oxide content was prepared:

| Ex. | Composition Mole % | | | Transformation Temperature °C | Rate of attack by water at 100°C % per minute |
|---|---|---|---|---|---|
| | $P_2O_5$ | ZnO | $Li_2O$ | | |
| 8 | 60 | 30 | 10 | 292°C | 0.002%/min |

EXAMPLE 9

The following glass contains more than one alkaline earth, and was prepared by the procedure of Example 1.

| Ex. | Composition Mole % | | | | Transformation Temperature °C | Density g/cm³ | Rate of attack by Water at 100°C % per minute |
|---|---|---|---|---|---|---|---|
| | $P_2O_5$ | ZnO | $Li_2O$ | BaO | | | |

For convenience, the glasses of the foregoing examples have the following weight % compositions:

| Example | $P_2O_5$ | ZnO | $Li_2O$ | MgO | BaO |
|---|---|---|---|---|---|
| 1 | 36.5 | 9.1 | 49.5 | 4.9 | — |
| 2 | 48.1 | 10.6 | 28.9 | 12.4 | — |
| 3 | 35.0 | 8.7 | 47.5 | 8.8 | — |
| 4 | 53.2 | 11.7 | 32.0 | — | 3.1 |
| 5 | 37.8 | 9.5 | 51.4 | — | 1.3 |
| 6 | 37.4 | 9.2 | 51.0 | — | 2.4 |
| 7 | 36.9 | 9.3 | 50.1 | — | 3.7 |
| 8 | 37.6 | 32.8 | 29.6 | — | — |
| 9 | 37.3 | 9.3 | 50.5 | 2.3 | 0.6 |

What we claim is:

1. An inorganic oxide glass composition consisting essentially of 58 to 76 mole % $P_2O_5$;
  5 to 30 mole % ZnO;
  5 to 25 mole % $Li_2O$; and
  0 to 10 mole % of one or more alkaline earth metal oxides, and wherein the total of all the above components is at least 99 mole % of the total composition, apart from any water which may be present in the glass in amounts up to 5% by weight of the total composition, the glass having a transformation temperature of not greater than 300°C. and a rate of solution in water at 100°C. of not greater than 1.3% per minute.

2. The glass composition as claimed in claim 1 in which the alkaline earth metal oxides, if present, are selected from MgO and BaO.

3. The glass composition of claim 2 in which the ranges are:

65 to 76 mole % $P_2O_5$;
  5 to 30 mole % ZnO;
  5 to 25 mole % $Li_2O$; and
  0 to 5 mole % MgO or 0 to 5 mole % BaO.

4. The glass composition of claim 1 in which the ranges are:

58 to 76 mole % $P_2O_5$;
  5 to 30 mole % ZnO;
  5 to 25 mole % $Li_2O$; and
  5 to 10 mole % of alkaline earth metal oxides.

5. The glass composition of claim 3 in which the composition is:

68.3 mole % of $P_2O_5$;
  9.75 mole % of ZnO;
  19.5 mole % of $Li_2O$; and
  2.44 mole % of MgO.

6. The glass composition of claim 3 in which the composition is:

65.1 mole % of $P_2O_5$;
  9.3 mole % of ZnO;
  18.6 mole % of $Li_2O$; and
  7.0 mole % of BaO.

7. A method of preparing an inorganic oxide glass comprising the steps of providing of the inorganic oxides or their precursors in molar proportions according to claim 1 and heating to a temperature in the range 300°C. to 500°C. to produce a glassy mixture, heating the mixture to a temperature of between 500°C. and 800°C. and for such time until a glass having the desired transformation temperature is produced.

* * * * *